(12) United States Patent
Diamond et al.

(10) Patent No.: US 9,509,242 B2
(45) Date of Patent: Nov. 29, 2016

(54) SYSTEMS AND METHOD FOR SPEED AND TORQUE CONTROL OF A DC MOTOR

(71) Applicant: Johnson Controls Technology Company, Holland, MI (US)

(72) Inventors: Russell W. Diamond, New Berlin, WI (US); Gary A. Romanowich, Slinger, WI (US); David R. Fuhr, Menomonee Falls, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 57 days.

(21) Appl. No.: 14/581,373

(22) Filed: Dec. 23, 2014

(65) Prior Publication Data
US 2015/0108933 A1 Apr. 23, 2015

Related U.S. Application Data

(63) Continuation of application No. 13/533,894, filed on Jun. 26, 2012, now Pat. No. 8,947,031.

(51) Int. Cl.
| | | |
|---|---|---|
| *H02P 7/00* | (2016.01) | |
| *H02P 7/29* | (2016.01) | |
| *H02P 29/00* | (2016.01) | |
| *H02P 29/02* | (2016.01) | |
| *H02H 7/08* | (2006.01) | |
| *H02H 7/085* | (2006.01) | |

(52) U.S. Cl.
CPC ............. *H02P 7/29* (2013.01); *H02H 7/0838* (2013.01); *H02H 7/0852* (2013.01); *H02P 7/04* (2016.02); *H02P 29/0033* (2013.01); *H02P 29/0044* (2013.01); *H02P 29/02* (2013.01); *H02P 29/027* (2013.01)

(58) Field of Classification Search
CPC .. H02P 7/29; H02P 29/0033; H02P 29/0044; H02P 29/02; H02P 29/027; H02H 7/0838; H02H 7/0852
USPC ............. 318/400.13, 599, 400.3, 400.1, 700; 388/804, 806, 811, 813, 814, 815, 819
See application file for complete search history.

(56) References Cited

U.S. PATENT DOCUMENTS

| | | | | |
|---|---|---|---|---|
| 3,624,475 A | | 11/1971 | Smith | |
| 4,763,347 A | * | 8/1988 | Erdman | H02P 6/182 318/400.21 |
| 5,019,757 A | * | 5/1991 | Beifus | F04D 27/004 318/400.07 |
| 5,034,871 A | * | 7/1991 | Okamoto | H02J 7/022 363/131 |
| 5,261,025 A | * | 11/1993 | Post | B60L 7/12 327/530 |
| 5,448,141 A | | 9/1995 | Kelley et al. | |
| 5,675,231 A | | 10/1997 | Becerra et al. | |
| 5,744,927 A | * | 4/1998 | Hayashida | H02P 21/0003 318/599 |
| 5,825,597 A | * | 10/1998 | Young | H02P 6/085 318/806 |
| 6,070,660 A | | 6/2000 | Byrnes et al. | |
| 6,173,902 B1 | | 1/2001 | Bauer et al. | |
| 6,491,094 B2 | | 12/2002 | Rayburn et al. | |
| 6,522,093 B1 | * | 2/2003 | Hsu | H02P 6/30 318/400.01 |

(Continued)

*Primary Examiner* — Rita Leykin
(74) *Attorney, Agent, or Firm* — Foley & Lardner LLP

(57) ABSTRACT

A method for operating a direct current (DC) motor is shown and described. The method includes generating a first pulse width modulated (PWM) signal having a first duty cycle, providing the first PWM signal as a PWM DC output for the DC motor, and adjusting the first duty cycle to control a speed of the DC motor. The method further includes sensing an electric current output to the motor using a current sensor and, when the sensed current exceeds a threshold, holding the PWM DC output off.

19 Claims, 8 Drawing Sheets

(56) References Cited

U.S. PATENT DOCUMENTS

| | | | |
|---|---|---|---|
| 6,624,606 B2* | 9/2003 | Kushida | H02P 6/20 318/431 |
| 6,647,325 B2* | 11/2003 | Shimazaki | B60L 11/1807 180/65.1 |
| 6,725,132 B2* | 4/2004 | Frankel | G05D 23/1902 361/695 |
| 6,820,409 B2* | 11/2004 | Braun | F01D 25/30 60/39.5 |
| 6,940,241 B2* | 9/2005 | Lange | G05B 19/042 318/265 |
| 7,012,393 B2 | 3/2006 | De Frutos et al. | |
| 7,021,072 B2* | 4/2006 | McMillan | F24F 13/1426 361/152 |
| 7,177,534 B2 | 2/2007 | Jones et al. | |
| 7,181,954 B2* | 2/2007 | Horie | F25B 49/005 62/125 |
| 7,265,512 B2 | 9/2007 | McMillan et al. | |
| 7,590,334 B2* | 9/2009 | Yabusaki | H02P 25/18 318/400.06 |
| 8,084,982 B2 | 12/2011 | Grabinger et al. | |
| 8,395,338 B2* | 3/2013 | Kuroda | H02P 6/20 318/400.11 |
| 8,606,016 B2 | 12/2013 | Hou et al. | |
| 8,947,031 B1 | 2/2015 | Diamond et al. | |
| 2003/0063900 A1 | 4/2003 | Wang et al. | |
| 2004/0105664 A1 | 6/2004 | Ivankovic | |
| 2008/0051024 A1 | 2/2008 | Caliendo et al. | |
| 2012/0290136 A1 | 11/2012 | Romanowich et al. | |
| 2015/0108933 A1 | 4/2015 | Diamond et al. | |

\* cited by examiner

SYSTEMS AND METHOD FOR SPEED AND TORQUE CONTROL OF A DC MOTOR

CROSS-REFERENCE TO RELATED PATENT APPLICATIONS

This application is a continuation of U.S. patent application No. 13/533,894 filed Jun. 26, 2012, the entire disclosure of which is incorporated by reference herein.

BACKGROUND

The present disclosure generally relates to the field of direct current (DC) motors. DC motors such as brushless DC motors are sometimes used in actuators for effecting movement of a component within a heating, ventilation, and air conditioning (HVAC) system.

Some conventional controls for brushless DC motors have used varying current to controllably affect speed of the brushless DC (BLDC) motor. Controllers for such systems are often difficult and expensive to implement for robust applications. Due to these difficulties, other controls for BLDC motors use varying voltage to controllably affect speed of the BLDC motor. Because voltage is controlled rather than current, Applicants have found that BLDC motors controlled using varying voltage can suffer from current-overrun conditions.

SUMMARY

One embodiment of the invention relates to a method for operating a direct current (DC) motor. The method includes using pulse width modulated (PWM) DC output to control the speed of the DC motor. The method further includes sensing current output to the motor. The method includes holding the PWM DC output off when the sensed current exceeds a threshold. The DC motor may be a brushless DC motor.

According to some embodiments, the method further includes resuming the PWM DC output in response to sensing the current output to the motor dropping below the threshold. The method further includes resuming the PWM DC output after a predetermined count. The current may be sensed by measuring voltage at a current sense resistor configured to measure the current output to the motor. The method may further include obtaining a voltage level for use as the threshold by outputting a second PWM signal at a duty cycle and filtering the second PWM signal to obtain a voltage level corresponding to that measured at the current sense resistor during over-current. The duty cycle of the PWM signal is user adjustable to allow for more or less current prior to holding the PWM DC output off. In some embodiments, the method includes receiving a temperature sensor input and, in response to the received temperature sensor input, automatically adjusting the duty cycle of the PWM signal to allow for more or less current prior to holding the PWM DC output off. The PWM DC output may be calculated by a microcontroller configured to vary the speed, position, or speed and position of the DC motor in response to a received input. The method may further include using a hall sensor to determine the position of the DC motor, detecting a stall using the position determined by the hall sensor, and turning the PWM DC output off in response to the detection of the stall. The method may further include, after detecting the stall, waiting for more than one count to determine whether the stall has continued for the more than one count, and only turning the PWM DC output off in response to the detection of the stall if the stall has continued for the more than one count.

One embodiment of the invention relates to a device for operating a direct current (DC) motor. The device includes a circuit configured to controllably output pulse width modulated (PWM) DC output to control the speed of the DC motor. The device further includes a current sensor coupled to the circuit and configured to sense current output to the motor. The circuit is configured to compare a value representative of the sensed current to a threshold and to hold the PWM DC output off in response to the comparison.

The circuit may be configured to resume the PWM DC output in response to sensing the current output to the motor dropping below the threshold in a subsequent period of time. The circuit may be further configured to resume the PWM DC output after a predetermined count. The circuit can measure the current by measuring voltage at a current sense resistor configured to measure the current output to the motor. The circuit may be configured to obtain a voltage level for use as the threshold by outputting a second PWM signal at a duty cycle and filtering the second PWM signal to obtain a voltage level corresponding to that measured at the current sense resistor during over-current. The circuit may be configured to receive user adjustments of the duty cycle of the PWM signal to cause the circuit to allow for more or less sensed current prior to holding the PWM DC output off. The circuit may further be configured to receive a temperature sensor input and, in response to the received temperature sensor input, to automatically adjust the duty cycle of the PWM signal to allow for more or less sensed current prior to holding the PWM DC output off. The circuit may be configured to calculate the PWM DC output in response to an input received from another device at an input interface. The circuit may include at least one hall sensor and the circuit may be configured to use the hall sensor to determine the position of the DC motor. The circuit is configured to detect a stall using the position determined by the hall sensor. The circuit is configured to turn the PWM DC output off in response to the detection of the stall. The circuit may be configured to, after detecting the stall, wait for more than one count to determine whether the stall has continued for the more than one count. The circuit may also be configured to only turn the PWM DC output off in response to the detection of the stall if the stall has continued for the more than one count.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for speed and torque control of a BLDC motor are shown and described. Pulse width modulation (PWM) is used for speed control of the BLDC motor. Current is monitored to determine whether torque is too high. A high current or torque condition results in restricting the PWM output until the high current or torque condition passes. The system advantageously results in a high level of speed control via the pulse width modulated DC, results in a relatively simple control method (a PID is not needed to closely track motor speed), and over-current or over-torque conditions are prevented from persisting if they are reached at all.

Figure 1:
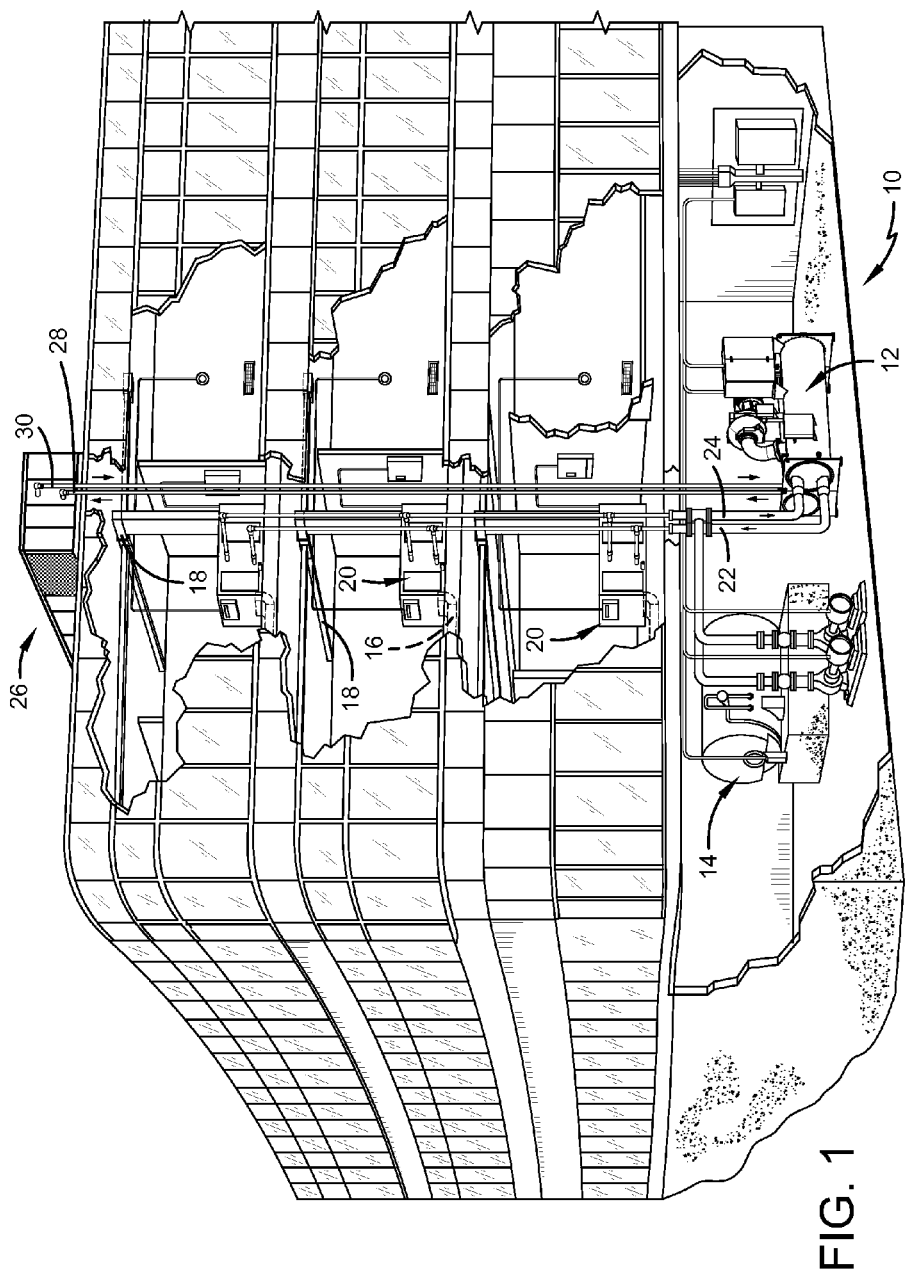
FIG. 1 is a perspective view of a building with an HVAC system, according to an exemplary embodiment.
Figure 2:
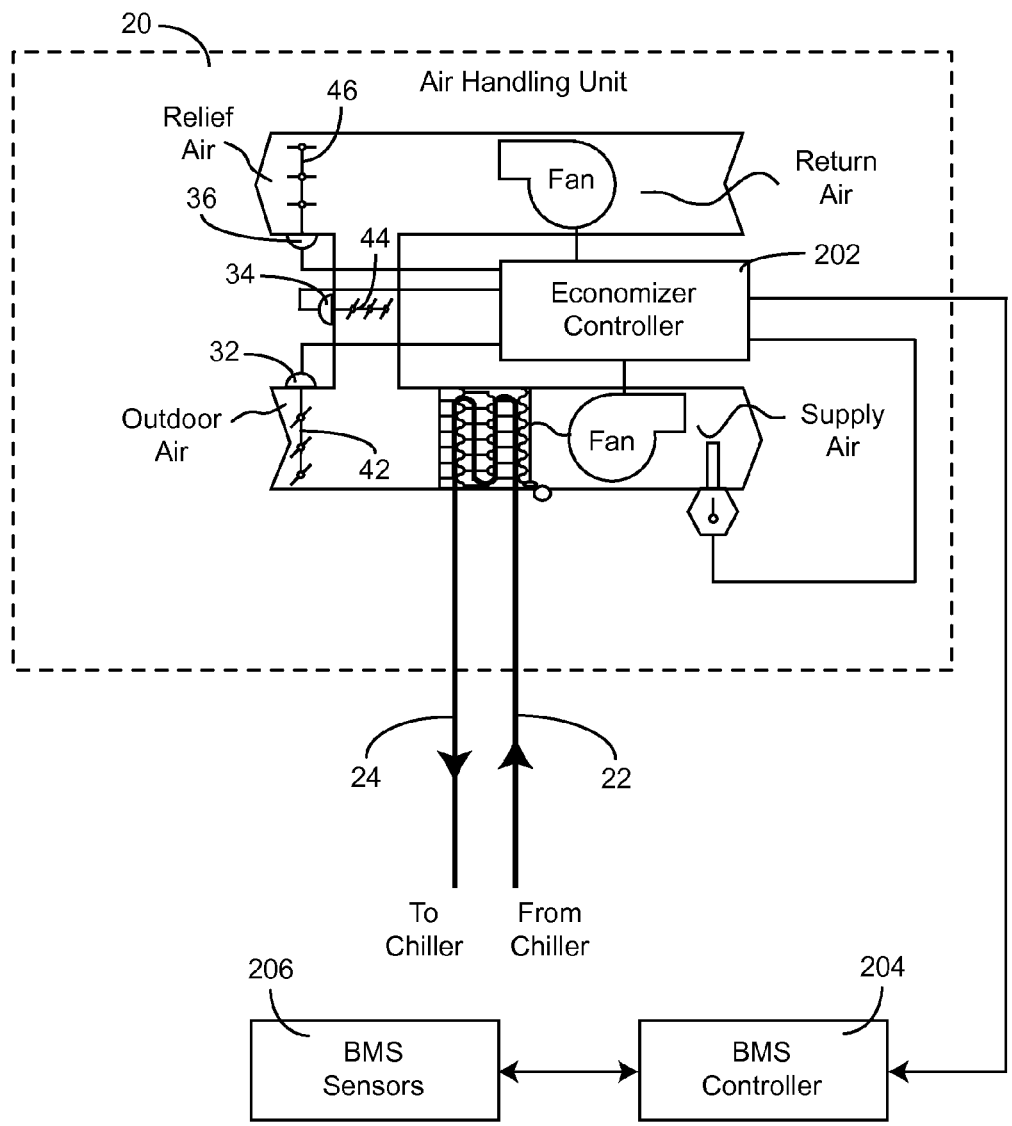
FIG. 2 is a block diagram of a portion of the HVAC system of FIG. 1, according to an exemplary embodiment.
Figure 3:
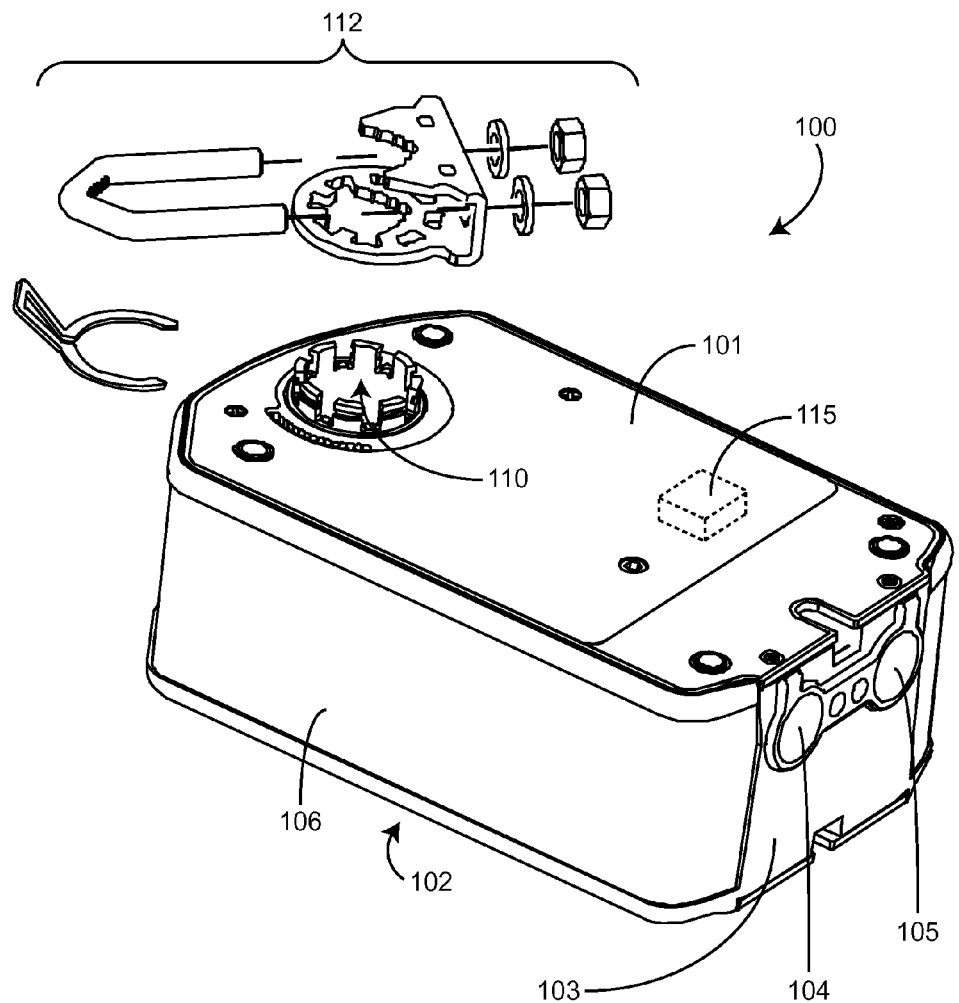
FIG. 3 is a perspective view of an actuator for an HVAC system, according to an exemplary embodiment.

FIGS. 1-3 illustrate an exemplary environment within which actuators, systems, and methods constructed according to embodiments of the present disclosure can exist. In other words, FIGS. 1-3 illustrate actuators for a building management system. The actuators can be implemented by BLDC motors and can use the systems and methods of the present application, according to varying embodiment.

Referring to FIG. 1, a perspective view of a building 10 is shown. Building 10 is shown to include a building control or management system such as an HVAC system. The illustration of building 10 includes a cutaway view of an exemplary HVAC system. The HVAC system shown in FIG. 1 uses a chilled fluid to remove heat from building 10. The chilled fluid is placed in a heat exchange relationship with the cooling load from the building, usually warm air, via a plurality of air handling units 20. During the heat exchange with the cooling load in air handling units 20, the chilled fluid receives heat from the load (i.e., warm air) and increases in temperature, removing heat from the load (e.g., air passed over piping in fan coil units, air handling units, or other air conditioning terminal units through which the chilled fluid flows). The resulting cooled air is provided from air handling units 20 to building 10 via an air distribution system including air supply ducts 18 and air return ducts 16. The HVAC system shown in FIG. 1 includes a separate air handling unit 20 on each floor of building 10, but components such as air handling unit 20 or ducts 18 may be shared between or among multiple floors. Boiler 14 can add heat to the air passing through air handling units 20 when conditions exist to warrant heating.

The chilled fluid is no longer chilled after receiving heat from the load in air handling units 20. To re-chill the fluid for recirculation back to the air-handling units, the fluid is returned to a chiller 12 via piping 24. Within chiller 12, the fluid is placed in a heat exchange relationship with another cooling fluid, usually a refrigerant, in the chiller's heat exchanger (e.g., an evaporator). The refrigerant in the chiller's evaporator removes heat from the chilled fluid during the evaporation process, thereby cooling the chilled fluid. The chilled fluid is then circulated back to the air handling units 20 via piping 22 for subsequent heat exchange with the load, and the cycle repeats.

The refrigerant in chiller 12 that absorbs heat from the chilled fluid changes from a boiling liquid and vapor state to vapor in the evaporator. The vapor is sucked or flows into a compressor of chiller 12 where the compressor's rotating impeller (or another compressor mechanism such as a screw compressor, scroll compressor, reciprocating compressor, centrifugal compressor, etc.) increases the pressure and temperature of the refrigerant vapor and discharges it into the condenser. The condensed refrigerant drains from the condenser into a return line where a variable orifice (e.g., variable expansion valve) meters the flow of liquid refrigerant to the evaporator to complete the refrigerant circuit.

In the embodiment of FIG. 1, water (or another chilled fluid) flows through tubes in the condenser of chiller 12 to absorb heat from the refrigerant vapor and causes the refrigerant to condense. The water flowing through tubes in the condenser is pumped from chiller 12 to a cooling tower 26 via piping 28. Cooling tower 26 utilizes fan driven cooling of the water or fan driven evaporation of the water to remove heat from the water delivered to cooling tower 26 via piping 28. The water cooled by cooling tower 26 is provided back to chiller 12's condenser via piping 30.

Referring now to FIG. 2, a block diagram of a portion of the HVAC system of FIG. 1 is shown according to an exemplary embodiment. In the embodiment of FIG. 2, chilled fluid is supplied via piping 22 to an air handling unit 20 that is an economizer type air handling unit. Economizer type air handling units vary the amount of outdoor air and return air used by the air handling unit for cooling. Air handling unit 20 is shown to include economizer controller 202 that utilizes one or more algorithms (e.g., state based algorithms, extremum seeking control algorithms, etc.) to control the actuators and dampers or fans of air handling unit 20. According to an exemplary embodiment, a single actuator is associated with each damper (such as, e.g., actuators 32, 34, 36 and dampers 42, 44, 46). These actuators may be as described with reference to subsequent Figures. Economizer controller 202 can be supervised by (e.g., monitored and provided commands) by one or more building management system (BMS) controllers 204.

A BMS controller is, in general, a computer-based system configured to control, monitor, and manage equipment in or around a building or building area. A BMS controller may include a METASYS building controller or other devices sold by Johnson Controls, Inc. The BMS controller may provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

For example, BMS controller 204 may provide a web-based graphical user interface that allows a user to set a desired setpoint temperature for a building space. BMS controller 204 can use BMS sensors 206 (connected to BMS controller 204 via a wired or wireless BMS or IT network) to determine if the setpoint temperatures for the building space are being achieved. BMS controller 204 can use such determinations to provide commands to economizer controller 202 or other components of the building's HVAC system.

Economizer controller 202 can receive control commands from BMS controller 204 and can base its output calculations on an input from BMS controller 204. For example, economizer controller 202 receives information (e.g., commands, setpoints, operating boundaries, etc.) from BMS controller 204. BMS controller 204 may provide economizer controller 202 with a ventilation amount that may translate to an actuator/damper position.

While economizer controller 202 is shown as separate from BMS controller 204, economizer controller 202 may be integrated with BMS controller 204. For example, economizer controller 202 may be a software module configured for execution by a processor of BMS controller 204.

Referring now to FIG. 3, an actuator 100 for use in an HVAC system (such as, e.g., HVAC system shown in FIGS. 1-2) is shown according to an exemplary embodiment. Actuator 100 may include a housing 106 having a first or front side 101 and second or rear side 102 that is opposite the first side 101. Housing 106 of actuator 100 also includes a bottom 103 having an input connection 104 and an output connection 105. Microcontroller 115 may be within housing 106 and may be configured to use inputs received from, e.g., an economizer controller or another upstream controller to determine and set a position for the actuator. The microcontroller may also be as described in subsequent Figures.

According to an exemplary embodiment, actuator 100 includes a drive device, mechanism, or hub 110 that is configured to drive or effectuate movement of a component of an HVAC system. For example, drive device 110 may be configured to receive a shaft of a damper (such as, e.g., dampers 42, 44, or 46 shown in FIG. 2) in order to drive (e.g., rotationally drive) the shaft. According to the exemplary embodiment shown in FIG. 3, actuator 100 includes a coupling device 112 configured to aid in coupling drive device 110 to, for example, the shaft of the damper.

Figure 4:
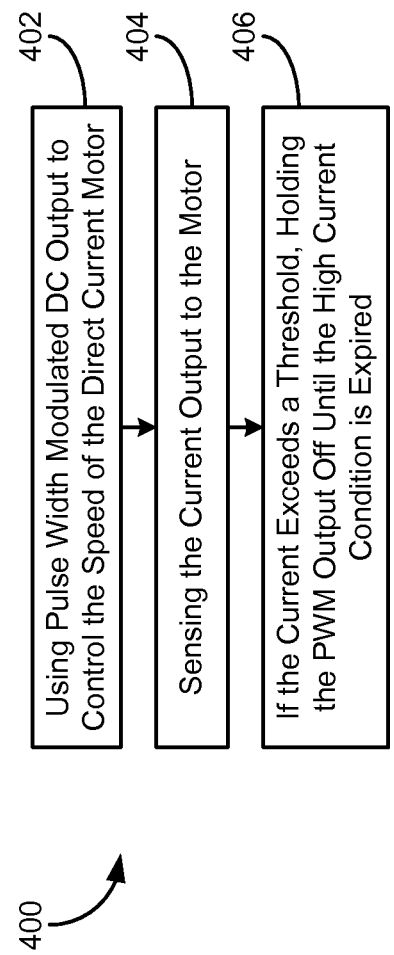
FIG. 4 is a flow chart of a process for controlling a DC motor, according to an exemplary embodiment.

Referring now to FIG. 4, a method 400 for operating a DC motor, such as a brushless DC motor is shown, according to an exemplary embodiment. The DC motor may be implemented within the actuators discussed with respect to FIGS. 1-3. The microcontroller 115 of FIG. 3 may particularly be configured to cause the steps of process 400 to be executed. However, it should be appreciated that solid state electronic circuitry may be provided to cause the steps of process 400 in place of a microcontroller.

Process 400 is illustrated to include the step of using pulse width modulated DC output to control the speed of the direct current motor (step 402). Logic for determining the speed or position of the actuator may be embedded within the microcontroller for implementing process 400, or the circuitry for making such a determination may be external to the actuator itself. In such instances, a setpoint may be provided to the actuator and the actuator's circuitry (e.g., the microcontroller) can use the pulse width modulation control to provide an appropriate DC output for achieving the requested speed of the DC motor.

Process 400 further includes sensing the current output to the motor (step 404). Sensing the current output to the motor may include using a current sense resistor to measure a voltage representative of the current output.

Process 400 also includes holding the PWM output in an off state if the sensed current exceeds a threshold (step 406). Holding the PWM output in an off state may be refraining from sending any pulses to the DC motor. As shown in process 400 the PWM output may be resumed when the high current condition is expired. The expiration of the high current condition may be sensed (e.g., when the sensed current falls below the threshold) or may be estimated based on an elapsed time period.

Figure 5:
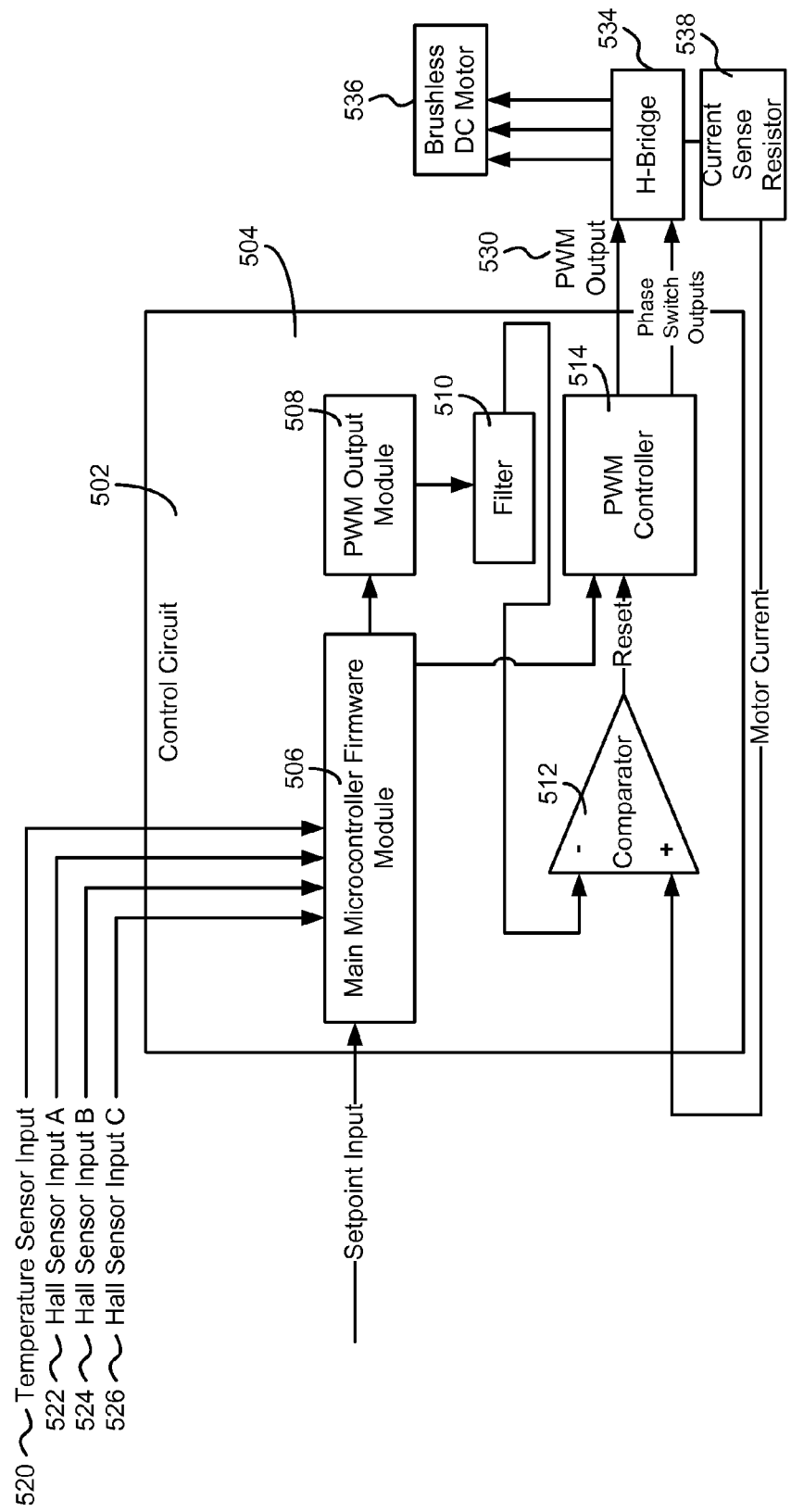
FIG. 5 is a block diagram of a device for controlling a DC motor, according to an exemplary embodiment.

In FIG. 5, a block diagram of a device for controlling a DC motor is shown, according to an exemplary embodiment. The device includes a control circuit 502 configured to cause pulse width modulated (PWM) DC output to control the speed of the brushless DC motor 536. The control circuit 502 is configured to compare a representation of the current output to the motor to a threshold and to hold the PWM DC output in an off state when the sensed current exceeds the threshold.

Control circuit 502 includes main microcontroller firmware module 506. Main microcontroller firmware module 506 may be the primary circuitry and/or executable software stored in non-volatile memory for processing setpoint input and hall sensor inputs 522, 524, and 526 and calculating an appropriate speed (e.g., in percentage terms, in terms of absolute position or speed, etc.) based on the processing. The duty cycle calculated by the main microcontroller firmware module 506 can be provided to the PWM controller 514.

The PWM controller 514 can take the speed (and/or other values) calculated by the main microcontroller firmware module 506 and output the pulse width modulated DC for providing to the brushless DC motor 536 via the H-bridge 534. The width of the output PWM pulses can be adjusted by the PWM controller 514 to achieve varying commanded motor speeds and/or to obtain varying motor or actuator positions.

The PWM controller 514 also outputs phase switch outputs to the H-Bridge 534. The phase switch outputs are used to control the polarity provided to the motor's windings. In other words, the duty cycle of the PWM output 530 to the H-bridge 534 determines the speed of the BLDC motor 536's rotation. The speed and phase by phase position of the rotor is measured by the firmware 506 using hall sensors (which may be integral to the BLDC motor 536). For example, the measured time between hall sensor activation can be converted and controlled as the speed of the controller (e.g., relative to a received setpoint input). The H-bridge 534 is illustrated in greater detail in FIG. 6. While an H-bridge is shown in drawings, other switching circuits or controls may be used to controllably vary the phase switching in synchronization with the desired speed or rotation of the DC motor 536.

As illustrated, the current sense resistor 538 is coupled to the H-bridge 534 in a manner that allows the current sense resistor 538 to provide a voltage output that provides an indication of the current output via PWM output 530 to the brushless DC motor 536 on any phase line. The reading representative of sensed current can be provided to comparator 512 (which may be a discrete electronics part or implemented within a microcontroller (e.g., microcontroller 506 or another microcontroller that forms a part of control circuit 502). In an exemplary embodiment, the motor current reading from current sense resistor 538 is compared against a threshold provided to the comparator 512.

In some embodiments, the threshold provided to the comparator 512 can be set based on temperature sensor input 520. As temperature sensor input 520 varies (e.g., based on the changing ambient temperature, based on a temperature of a motor element, etc.), the main microcontroller firmware module 506 can cause the threshold to be adjusted. The main microcontroller firmware module 506 can adjust the threshold (which may start as digital value in module 506 that is raised or lowered by temperature) by providing the digital value to PWM output module 508, converting the digital value to a PWM signal. The PWM signal can be converted to a DC voltage for comparison to the output of the current sense resistor 538 by using a low pass filter (e.g., a first order low pass filter having a resistor in series with the load and a capacitor in parallel with the load, a low pass filter of a different order, etc.). As the temperature received at temperature sensor input 520 changes, the duty cycle of the PWM output module 508 can change, causing the DC received from filter 510 at comparator 512 as a threshold to change. While the threshold can be caused to be adjusted automatically by the main microcontroller firmware module 506, in other embodiments the threshold can be user adjustable, static, or dynamic based on variables instead of or in addition to ambient temperature.

If the motor current from current sense resistor 538 exceeds the threshold received from filter 510, the comparator 512 can be configured to output a reset signal to the PWM controller 514. The application of the reset signal can cause the PWM controller's output to be off for a period of time or until the comparator 512 indicates that the motor current from the current sense resistor 538 no longer exceeds the threshold. In other words, if the threshold is set to correspond to the estimated maximum current for a given ambient temperature, as the maximum current of motor 536 is approached, comparator output 512 may begin to interfere (e.g., hold in an off state) with the PWM controller 514's output, causing motor 536 to slow down. The current and torque of motor 536 may therefore, advantageously, never exceed the imposed or set limit(s). Advantageously, the torque of the motor (current used as a proxy) is not dynamically controlled and can not only be established on the initial application of power but can also be altered over time (e.g., as the temperature increases).

Figure 6:
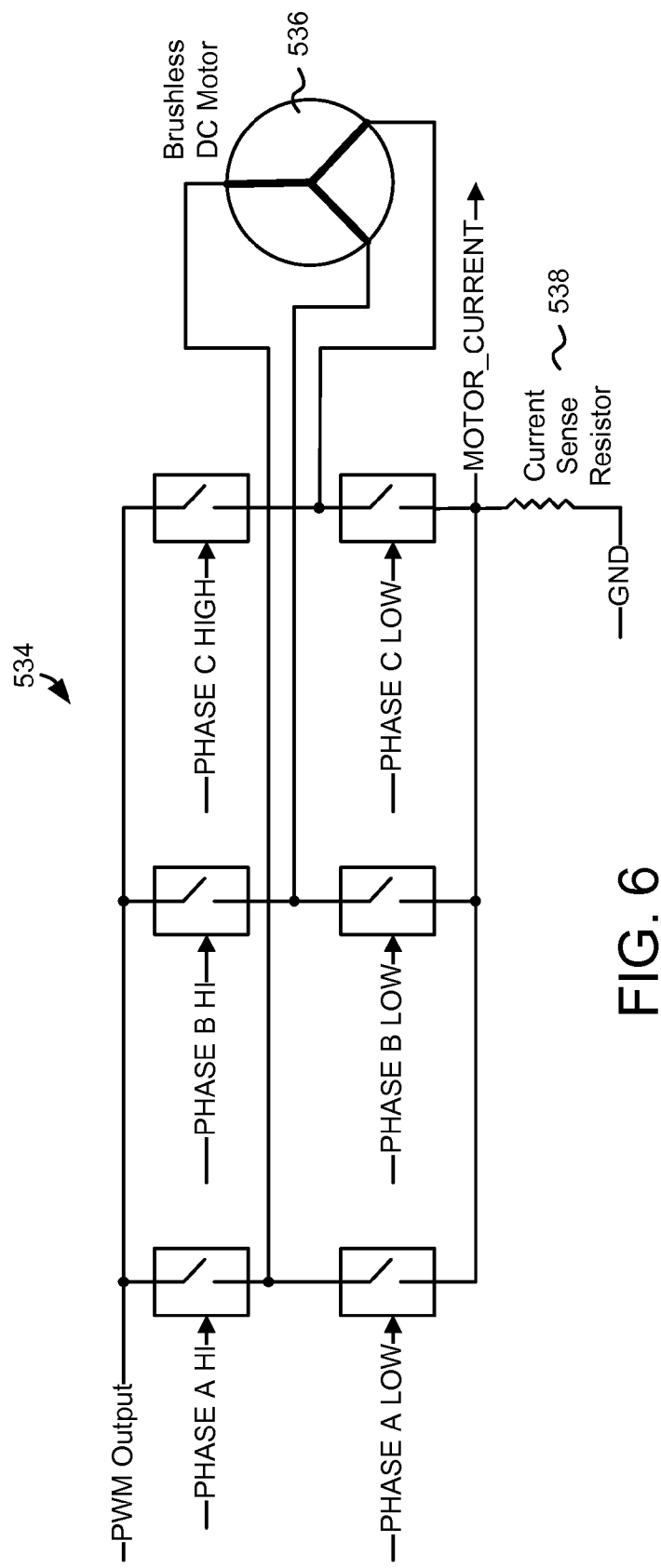
FIG. 6 is a more detailed illustration of the H-bridge and motor of FIG. 5, according to an exemplary embodiment.

Referring now in particular to FIG. 6, the H-bridge 534, BLDC motor 536 and current sense resistor 538 of FIG. 5 are shown in greater detail, according to an exemplary embodiment. H-bridge 534 is shown to include high and low inputs for each of three phase lines of the BLDC 536. The switching elements may be six transistors configured to allow or deny current to flow through the switches from the PWM output. The current sense resistor can be configured to sense current provided to BLDC 536 regardless of the active winding.

Figure 7:
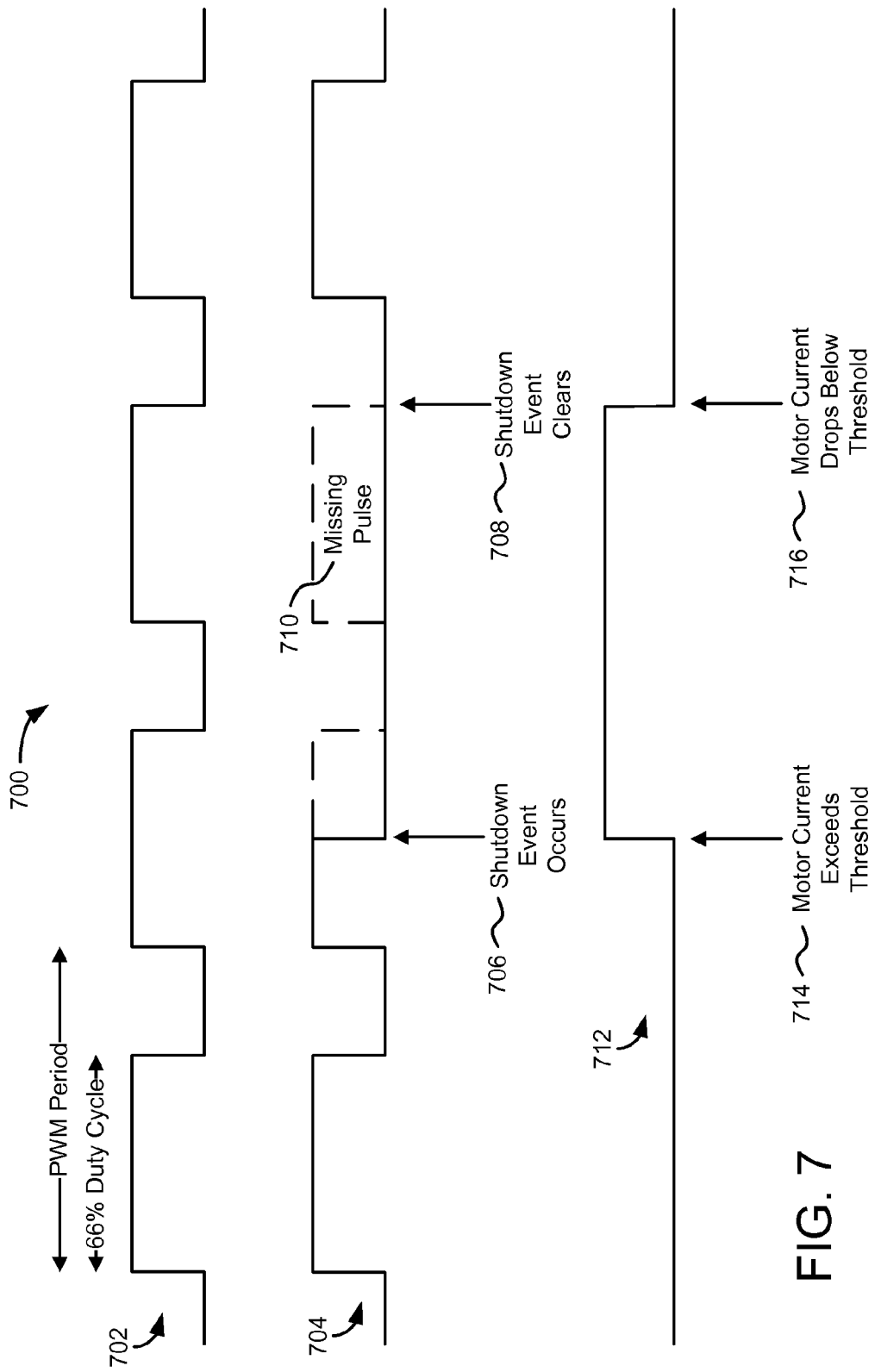
FIG. 7 is an illustration of exemplary control signals used by the systems and method of the present disclosure and the impact of high current events, according to an exemplary embodiment.

Referring now to FIG. 7, an illustration 700 of the activity of the control circuit of FIGS. 5 and 6 is shown, according to an exemplary embodiment. Illustration 700 includes a normal PWM output 702 (e.g., having a steady 66% duty cycle, which may be associated with a particular speed of movement) and an affected PWM output 704 where a current overrun event was experienced. PWM output 704 is based on reset signal 712 (e.g., the reset signal provided from the comparator 512 to the PWM controller 514). When the motor current exceeds the threshold at time 714, the reset line 714 can move high. When the reset line 714 is high, the PWM controller 514 can cause a shutdown event 706 to occur. Shutdown event can mean holding the pulse width modulated DC output provided to the H-bridge in an off state. Therefore, as is illustrated by PWM output 704, part of a first pulse and an entire missing pulse 710 are "off" rather than "on" due to the shutdown event 706 (caused by reset line 712 and the motor current exceeding the threshold). This causes the motor to slow down, reducing current and advantageously avoiding prolonged or series overcurrent. When the shutdown event clears at time 708, the PWM output 704 can continue as usual.

Figure 8:
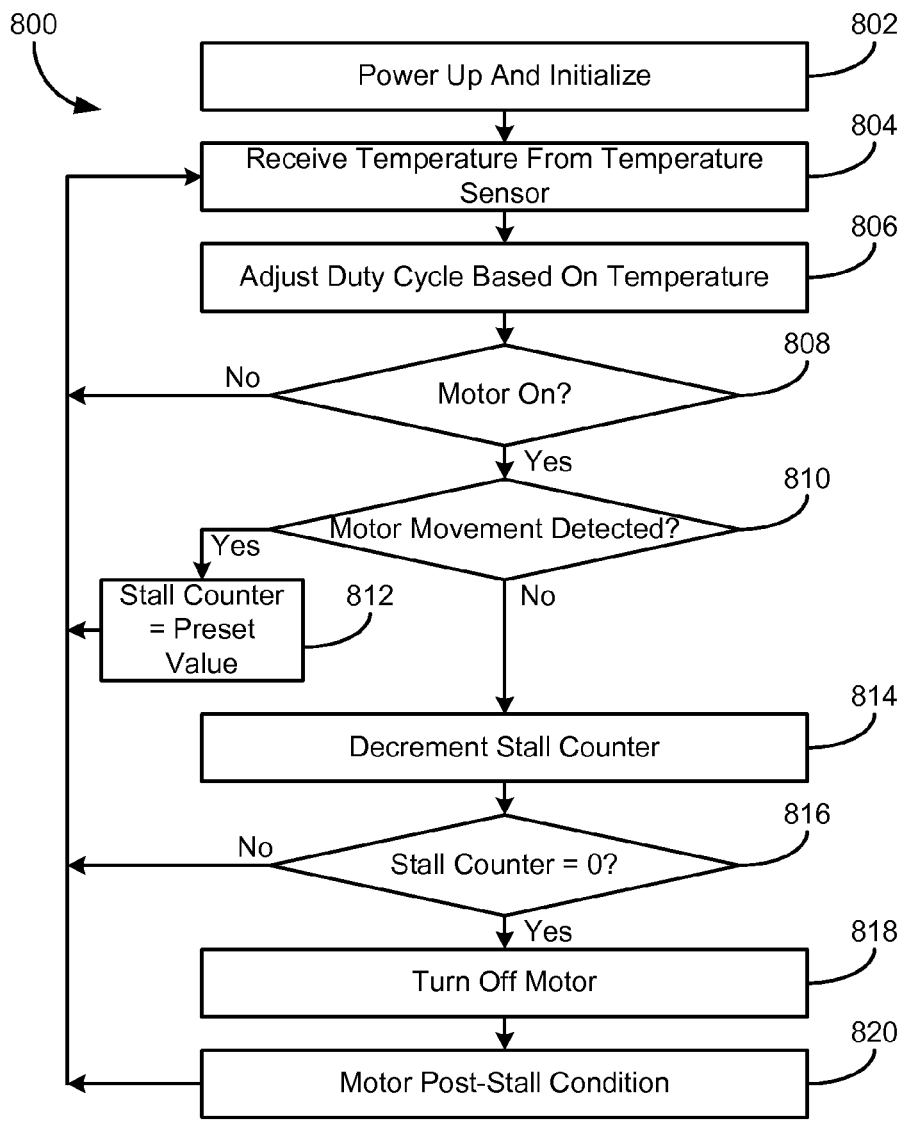
FIG. 8 is a flow chart of a process for controlling a DC motor, according to some alternative or exemplary embodiments.

Referring now to FIG. 8, another process for operating a DC motor is shown, according to an exemplary embodiment. Process 800 includes powering up and initializing (step 802). This step can include recalling an initial duty cycle and recalling an initial stall counter state (which may be some non-zero number).

Process 800 further includes receiving a temperature reading from a temperature sensor (step 804). As discussed above, the duty cycle of the shutoff sequence may be adjusted based on the temperature (step 806).

Process 800 further includes determining if the motor is on (step 808). If the motor is on, process 800 may include checking if motor movement is detected (step 810). Motor movement may be checked using one or more hall sensors. If the motor is moving, the stall counter (e.g., the counter used to represent a stalled motor condition) is reset to a default value and process 800 resets (step 812).

If the motor is currently stalled, the stall counter is decremented (step 814) but not stopped (e.g., allowing for a temporary stall). When the stall counter reaches zero (step 816), the motor may be turned off (step 818) and the motor enters a post-stalling condition (step 820). The post stall condition may include resuming operation once the stall condition is cleared (e.g., movement is detected). In an exemplary embodiment, the process of FIG. 8 can run in parallel to the processes for operation described herein that rely on holding PWM in an off state during an over current condition (overcurrent can be caused by stalls). In other embodiments, the process of FIG. 8 may be run as one alternative to the process described with reference to the previous Figures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for operating a direct current (DC) motor, the method comprising:
    generating a first pulse width modulated (PWM) signal having a first duty cycle;
    providing the first PWM signal as a PWM DC output for the DC motor;
    adjusting the first duty cycle to control a speed of the DC motor;
    sensing an electric current output to the motor using a current sensor; and
    when the sensed current exceeds a threshold, holding the PWM DC output off for at least a full PWM period.

2. The method of claim 1, further comprising:
    resuming the PWM DC output in response to sensing the electric current output to the motor dropping below the threshold.

3. The method of claim 1, further comprising:
    resuming the PWM DC output after a predetermined count.

4. The method of claim 1, further comprising:
    generating a second PWM signal having a second duty cycle; and
    using the second PWM signal to determine the threshold.

5. The method of claim 4, wherein generating the second PWM signal comprises:
    receiving a temperature sensor input; and
    determining a value for the second duty cycle based on the temperature sensor input.

6. The method of claim 4, wherein using the second PWM signal to determine the threshold comprises:
    outputting the second PWM signal at the second duty cycle;
    filtering the second PWM signal to obtain a voltage level; and
    using the voltage level as the threshold.

7. The method of claim 6, wherein the voltage level used as the threshold corresponds to a voltage level measured by the current sensor during over-current.

8. The method of claim 1, wherein the PWM DC output is calculated by a microcontroller configured to vary the speed, position, or speed and position of the DC motor in response to a received input.

9. The method of claim 1, further comprising:
    using a hall sensor to determine the position of the DC motor;
    detecting a stall using the position determined by the hall sensor;
    turning the PWM DC output off in response to the detection of the stall.

10. The method of claim 9, further comprising:
    after detecting the stall, waiting for more than one count to determine whether the stall has continued for the more than one count, and only turning the PWM DC output off in response to the detection of the stall if the stall has continued for the more than one count.

11. A device for operating a direct current (DC) motor, the device comprising:
    a circuit configured to generate a first pulse width modulated (PWM) signal having a first duty cycle adjustable to control a speed of the DC motor and to provide the first PWM signal as a PWM DC output for the DC motor; and
    a current sensor coupled to the circuit and configured to sense an electric current output to the motor;
    wherein the circuit is configured to compare a value representative of the sensed current to a threshold and to hold the PWM DC output off for at least a full PWM period in response to the value representative of the sensed current exceeding the threshold.

12. The device of claim 11, wherein the circuit is further configured to resume the PWM DC output in response to sensing the electric current output to the motor dropping below the threshold in a subsequent period of time.

13. The device of claim 11, wherein the circuit is further configured to resume the PWM DC output after a predetermined count.

14. The device of claim 11, wherein the circuit is further configured to:
    generate a second PWM signal having a second duty cycle; and
    use the second PWM signal to determine the threshold.

15. The device of claim 14, wherein generating the second PWM signal comprises:
    receiving a temperature sensor input; and
    determining a value for the second duty cycle based on the temperature sensor input.

16. The device of claim 14, wherein using the second PWM signal to determine the threshold comprises:
    outputting the second PWM signal at the second duty cycle;
    filtering the second PWM signal to obtain a voltage level; and
    using the voltage level as the threshold.

17. The device of claim 16, wherein the voltage level used as the threshold corresponds to a voltage level measured by the current sensor during over-current.

18. The device of claim 11, wherein the circuit comprises at least one hall sensor and the circuit is configured to use the hall sensor to determine the position of the DC motor, wherein the circuit is configured to detect a stall using the position determined by the hall sensor, wherein the circuit is configured to turn the PWM DC output off in response to the detection of the stall.

19. The device of claim 18, wherein the circuit is configured to, after detecting the stall, wait for more than one count to determine whether the stall has continued for the more than one count, and wherein the circuit is configured to only turn the PWM DC output off in response to the detection of the stall if the stall has continued for the more than one count.

* * * * *